United States Patent
Matsuda

(10) Patent No.: US 8,293,822 B2
(45) Date of Patent: Oct. 23, 2012

(54) RUBBER-METAL COMPOSITE AND PNEUMATIC TIRE USING THE SAME

(75) Inventor: Takashi Matsuda, Kanagawa-ken (JP)

(73) Assignee: The Yokohama Rubber Co. Ltd (JP)

( * ) Notice: Subject to any disclaimer, the term of this patent is extended or adjusted under 35 U.S.C. 154(b) by 0 days.

(21) Appl. No.: 13/084,393

(22) Filed: Apr. 11, 2011

(65) Prior Publication Data

US 2011/0263761 A1    Oct. 27, 2011

(30) Foreign Application Priority Data

Apr. 23, 2010  (JP) ................. 2010-099691

(51) Int. Cl.
*C08K 13/06*  (2006.01)
*C08L 7/00*   (2006.01)
*C07D 294/02* (2006.01)

(52) U.S. Cl. ............. 524/91; 524/94; 524/431; 152/394

(58) Field of Classification Search .............. 524/91, 524/94, 431; 152/394
See application file for complete search history.

(56) References Cited

U.S. PATENT DOCUMENTS

| 7,951,439 B2 * | 5/2011 | Gong et al. ................. 428/36.8 |
| 2010/0200141 A1 * | 8/2010 | Yamamoto ................. 152/527 |

FOREIGN PATENT DOCUMENTS

| JP | 58-2004183 | 11/1983 |
| JP | 61-081802 | 4/1986 |
| JP | 7-99647 | 10/1995 |
| JP | 11-092675 | 4/1999 |
| JP | 2003-313369 | 11/2003 |
| JP | 2006-117781 | 5/2006 |

* cited by examiner

*Primary Examiner* — Robert D. Harlan
(74) *Attorney, Agent, or Firm* — Thorpe North & Western LLP

(57) ABSTRACT

The present technology provides a rubber-metal composite having high water resistant adhesion strength and a pneumatic tire using the same by providing a rubber-metal composite having metal reinforcing cords embedded in a rubber composition including from 0.05 to 10 parts by mass of a benzothiazole anticorrosive and/or a benzotriazole anticorrosive per 100 parts of a diene rubber. The present technology also provides a pneumatic tire using the rubber-metal composite.

19 Claims, No Drawings

RUBBER-METAL COMPOSITE AND PNEUMATIC TIRE USING THE SAME

PRIORITY CLAIM

Priority is claimed to Japan Patent Application Serial No. 2010-099691 filed on Apr. 23, 2010, the contents of which is incorporated herein by reference in its entirety.

BACKGROUND

1. Technical Field

The present technology relates to a rubber-metal composite and a pneumatic tire using the same, and particularly relates to a rubber-metal composite having high water resistant adhesion strength and a pneumatic tire using the same.

2. Related Art

Reinforcing pneumatic tires and the like using, for example, brass-plated steel cords is well known. However, with such steel cords, water resistant adhesion strength to rubber is typically poor.

Japanese Examined Patent No. H07-099647B discloses an insulated wire, comprised of a rubber including A) benzotriazole, and B) 1-methylbenzotriazole and/or 5-methyl-1.H-benzotriazole, and a plastic insulating body being coated on a twisted-wire copper conductor.

In another example, Japanese Unexamined Patent Application No. H11-092675A discloses a high damping material composition constituted by compounding an additive (i.e. an anticorrosive such as 1-[N,N-bis(2-ethyl-hexyl)aminomethyl]benzotriazole, or the like) with a base polymer material having a polar side chain and by further compounding an ester plasticizer.

However, these references do not disclose or suggest enhancing water resistant adhesion strength by embedding metal reinforcing cords in the rubber.

SUMMARY

The present technology provides a rubber-metal composite having high water resistant adhesion strength and a pneumatic tire using the same. The inventors, as a result of diligent research, discovered that the present technology can be achieved by embedding metal reinforcing cords in a rubber composition obtained by compounding a specific amount of a specific anticorrosive in a diene rubber, and thus arrived at the present technology. Specifically, the present technology is described hereinafter.

A rubber-metal composite can be constituted by embedding metal reinforcing cords in a rubber composition including from 0.05 to 10 parts by mass of a benzothiazole anticorrosive and/or a benzotriazole anticorrosive per 100 parts of a diene rubber. Example anticorrosives can include (2-benzothiazylthio)acetic acid, 3-(2-benzothiazylthio)propionic acid, 1-[N,N-bis(2-ethylhexyl)aminomethyl]tolyltriazole, 1-[N,N-bis(hydroxyethyl)aminomethyl]tolyltriazole, carboxybenzotriazole, 1-[N,N-bis(2-ethylhexyl)aminomethyl] methylbenzotriazole, 1,2,3-benzotriazole, 1-[N,N-bis(2-ethylhexyl)aminomethyl]benzotriazole, and 2,2'-[[(methyl-1H-benzotriazole-1-yl)methyl]imino]bisethanol.

The rubber-metal composition may further include from 3 to 15 parts by mass of sulfur per 100 parts by mass of the diene rubber.

In one example, a pneumatic tire is provided using a rubber-metal composite constituted by embedding metal reinforcing cords in a rubber composition including from 0.05 to 10 parts by mass of a benzothiazole anticorrosive and/or a benzotriazole anticorrosive per 100 parts of a diene rubber. Some example metal reinforcing cords include belt cords, carcass cords, and bead cords.

According to the present technology, metal reinforcing cords can be embedded in a rubber composition obtained by compounding a specific amount of a specific anticorrosive in a diene rubber. Therefore, a rubber-metal composite having high water resistant adhesion strength and a pneumatic tire using the same can be provided.

DETAILED DESCRIPTION

The present technology is explained in further detail below. A rubber composition to be used in the present technology will be described first.

Diene Rubber

Any diene rubber that can be compounded in a rubber composition may be used as the diene rubber for use in the present technology. Examples of the diene rubber include natural rubber (NR), isoprene rubber (IR), butadiene rubber (BR), styrene-butadiene copolymer rubber (SBR), acrylonitrile-butadiene copolymer rubber (NBR), and the like. One of these may be used alone, or two or more may be used in any combination. Additionally, a molecular mass and a microstructure of the diene rubber component is not particularly limited and may by terminally modified by an amine, amide, silyl, alkoxysilyl, carboxyl, or hydroxyl group or the like or be epoxidated. Among these diene rubbers, from a perspective of the effectiveness of the present technology, NR is preferably compounded as the diene rubber.

Anticorrosive

An anticorrosive for use in the present technology is a benzothiazole anticorrosive and/or a benzotriazole anticorrosive.

Regarding the anticorrosives, from the perspective of the effectiveness of the present technology, the benzothizole anticorrosive is preferably (2-benzothiazylthio)acetic acid or 3-(2-benzothiazylthio)propionic acid; and the benzotriazole anticorrosive is preferably 1-[N,N-bis(2-ethylhexyl)aminomethyl]tolyltriazole, 1-[N,N-bis(hydroxyethyl)aminomethyl]tolyltriazole, carboxybenzotriazole, 1-[N,N-bis(2-ethylhexyl)aminomethyl]methylbenzotriazole, 1,2,3-benzotriazole, 1-[N,N-bis(2-ethylhexyl)aminomethyl] benzotriazole, or 2,2'-[[(methyl-1H-benzotriazole-1-yl) methyl]imino]bisethanol. Two or more of these anticorrosives can be mixed and used as necessary.

The rubber composition of the present technology is constituted by compounding from 0.05 to 10 parts by mass of the anticorrosive per 100 parts by mass of the diene rubber.

If the compounded amount of the anticorrosive is less than 0.5 parts by mass, the added amount will be too small and the effects of the present technology cannot be achieved. On the other hand, if the compounded amount exceeds 10 parts by mass, the effects will be excessive and the cost performance of the present technology will be adversely affected. It is more preferable that from 0.1 to 2.0 parts by mass of the anticorrosive be compounded per 100 parts by mass of the diene rubber.

Other Components

The rubber composition for use in the present technology may include, in addition to the above components, vulcanizing or cross-linking agents; vulcanizing or cross-linking accelerators; fillers such as zinc oxide, carbon black, silica, clay, talc, and calcium carbonate; various oils; antiaging agents; plasticizers; and other various additives commonly included in rubber compositions. The additives are compounded by a common method to obtain a composition that can then be used for vulcanization or cross-linking. Compounded amounts of these additives may be any conventional standard amount, so long as the object of the present technology is not hindered.

Note that when sulfur is used as a vulcanizing agent, from the perspective of the effectiveness of the present technology, a compounded amount thereof is preferably from 3 to 15 parts by mass, and more preferably from 4 to 9 parts by mass per 100 parts by mass of the diene rubber.

Additionally, when zinc oxide is used, from the perspective of the effectiveness of the present technology, a compounded amount thereof is preferably from 5 to 15 parts by mass, and more preferably from 7 to 11 parts by mass per 100 parts by mass of the diene rubber.

Additionally, from the perspective of the effectiveness of the present technology, preferably an organic cobalt compound such as, for example, cobalt benzoate, cobalt naphthenate, cobalt sterate, cobalt neodecanoate, cobalt ortho-borate, cobalt octoate, a cobalt boron complex, or the like is compounded in the rubber composition. A compounded amount thereof, as the cobalt, is preferably from 0.1 to 3.0 parts by mass and more preferably from 0.2 to 1.0 parts by mass per 100 parts by mass of the diene rubber.

Examples of the metal reinforcing cords for use in the present technology include metal reinforcing cords conventionally used in conveyor belts, hoses, tires, and the like. For example, when applied to a tire, the metal reinforcing cords may be a belt, a carcass, or a bead (including a bead core and a steel cord contained therein) embedded in an under tread. Additionally, the metal reinforcing cords are preferably brass-plated.

The rubber-metal composite of the present technology can be obtained by, for example, preparing the rubber composition by mixing the various components in a general-purpose mixer such as a Banbury Mixer or a roll mixer, embedding the metal reinforcing cords therein, and for example, vulcanizing according to a conventional method.

Examples of applications of the rubber-metal composite of the present technology include conveyor belts, hoses, tires, and the like, but tire applications are particularly preferable. When used in a tire application, the manufacturing method thereof is not particularly limited and a pneumatic tire can be manufactured according to a known technique.

EXAMPLES

The present technology is further explained in detail, referring to the examples and comparative examples described hereinafter. However, the present technology is not limited by these examples.

Examples 1 to 4 and Comparative Examples 1 to 2

Preparation of Sample

According to the composition (parts by mass) shown in Table 1, the components, other than the vulcanization components (vulcanization accelerator and sulfur), were kneaded for three minutes in a 1.7 liter sealed Banbury Mixer. Then, the composition was discharged from the mixer and cooled to room temperature. Thereafter, the rubber composition was obtained by placing the composition in the same Banbury Mixer again, adding the vulcanization components, and kneading. Next, using the obtained rubber composition, physical properties were measured according to the following test methods.

Pre-aging Adhesion Performance Test: Testing was performed in accordance with the American Society for Testing and Materials (ASTM) standard D-2229. Brass plated steel cords, laid out in parallel at intervals of 12.7 mm were coated with the rubber composition, embedded at an embedding length of 12.7 mm, and bonded by vulcanization under vulcanizing conditions of 160° C.×20 minutes. Thus, an adhesion sample was fabricated. The steel cords were pulled out of this adhesion sample and an evaluation was performed based on the pull-out force and the adhesive pick up (%) of the rubber coated on the surface of the steel cords. The results are shown as an index with the value of Comparative Example 1 being 100. Larger index values indicate superior adhesive strength to rubber.

Post-aging Adhesion Performance Test: The vulcanized adhesion sample described above was left to age for two weeks under the following conditions: Temperature=70° C.; Humidity=96%. This sample was subjected to the same test as in the Pre-aging Adhesion Performance Test and evaluated based on the pull-out force and the adhesive pick up (%) of the rubber. The results are shown as an index with the value of Comparative Example 1 being 100. Larger index values indicate superior adhesive strength to rubber.

The results are also shown in Table 1.

TABLE 1

|  | CE 1 | CE 2 | Ex 1 | Ex 2 | Ex 3 | Ex 4 |
|---|---|---|---|---|---|---|
| NR[*1] | 100 | 100 | 100 | 100 | 100 | 100 |
| Carbon black[*2] | 60 | 60 | 60 | 60 | 60 | 60 |
| Zinc oxide[*3] | 10 | 10 | 10 | 10 | 10 | 10 |
| Antiaging agent-1[*4] | 1 | 1 | 1 | 1 | 1 | 1 |
| Antiaging agent-2[*5] | 1 | 1 | 1 | 1 | 1 | 1 |
| Organic cobalt compound[*6] | 2 | 2 | 2 | 2 | 2 | 2 |
| Resin[*7] | 1 | 1 | 1 | 1 | 1 | 1 |
| Sulfur[*8] | 7.5 | 7.5 | 7.5 | 7.5 | 7.5 | 7.5 |
| Vulcanization accelerator[*9] | — | 0.5 | — | — | — | — |
| Anticorrosive-1[*10] | — | — | 0.33 | — | — | 1 |
| Anticorrosive-2[*11] | — | — | — | 0.33 | — | — |
| Anticorrosive-3[*12] | — | — | — | — | 0.33 | — |
| Resin curing agent[*13] | 3 | 3 | 3 | 3 | 3 | 3 |
| Test results |  |  |  |  |  |  |
| Pre-aging Adhesion Performance Test (pull-out force) | 100 | 101 | 99 | 108 | 102 | 99 |
| Pre-aging Adhesion Performance Test (adhesive pick up) | 100 | 99 | 101 | 100 | 101 | 102 |
| Post-aging Adhesion Performance Test (pull-out force) | 100 | 102 | 104 | 109 | 104 | 103 |
| Post-aging Adhesion Performance Test (adhesive pick up) | 100 | 110 | 115 | 113 | 112 | 113 |

Note that in Table 1, "CE" is an abbreviation for "Comparative Example" and "Ex" is an abbreviation for "Example".
[*1]NR (RSS#3)
[*2]Carbon black (SEAST KH, manufactured by Tokai Carbon Co., Ltd.; iodine absorption number: 90 cm$^3$/100 g; DBP absorption number: 119 × 10$^{-5}$ m$^3$/kg)
[*3]Zinc oxide (Zinc Oxide #3, manufactured by Seido Chemical Industry Co., Ltd.)
[*4]Antiaging agent-1 (Santoflex 6PPD, manufactured by Flexsys)
[*5]Antiaging agent-2 (Nocrac 224, manufactured by Ouchi Shinko Chemical Industrial Co., Ltd.)
[*6]Organic cobalt compound (Cobalt Naphthenate, manufactured by Nippon Mining & Metals Co., Ltd.; Co content = 10 mass %)
[*7]Resin (SUMIKANOL 610, manufactured by Taoka Chemical Co., Ltd.)
[*8]Sulfur (Crystex HS OT 20, manufactured by Akzo Nobel)
[*9]Vulcanization accelerator (Nocceler DZ, N,N-dicyclohexyl-2-benzothiazolylsulfenamide, manufactured by Ouchi Shinko Chemical Industrial Co., Ltd.)
[*10]Anticorrosive-1 (ABT, (2-benzothiazylthio)acetic acid, manufactured by Sanshin Chemical Industry Co., Ltd.)
[*11]Anticorrosive-2 (PBT, 3-(2-benzothiazylthio)propionic acid, manufactured by Sanshin Chemical Industry Co., Ltd.)
[*12]Anticorrosive-3 (Benzotriazole Anticorrosive, manufactured by Johoku Chemical Co., Ltd.; Compound name = 1,2,3-benzotriazole)
[*13]Resin curing agent (Sumikanol 507A, manufactured by Bara Chemical Co., Ltd.)

With the rubber-metal composites fabricated according to Examples 1 to 4, a specific amount of a specific anticorrosive is compounded in a diene rubber and metal reinforcing cords are embedded in the obtained rubber composition. Therefore, as is clear from Table 1, when compared with Comparative Example 1, which is representative of the conventional technology, water resistant adhesion strength is enhanced.

On the other hand, Comparative Example 2 is an example in which the anticorrosive was replaced with a vulcanization accelerator (a molar amount of the vulcanization accelerator was equal to the molar amount of the anticorrosive used in the Examples), but water resistant adhesion strength equal to that of the Examples was not obtained.

What is claimed is:

1. A rubber-metal composite comprised by embedding metal reinforcing cords in a rubber composition comprising from 0.05 to 10 parts by mass of a benzothizole anticorrosive and/or a benzotriazole anticorrosive per 100 parts of a diene rubber, wherein the anticorrosive is at least one selected from the group consisting of (2-benzothiazylthio)acetic acid, 3-(2-benzothiazylthio)propionic acid, 1-[N,N-bis(2-ethylhexyl)aminomethyl]tolyltriazole, 1-[N,N-bis(hydroxyethyl)aminomethyl]tolyltriazole, carboxybenzotriazole, 1-[N,N-bis(2-ethylhexyl)aminomethyl]methylbenzotriazole, 1-[N,N-bis(2-ethylhexyl)aminomethyl]benzotriazole, and 2,2'-[[(methyl-1H-benzotriazole-1-yl)methyl]imino]bisethanol.

2. The rubber-metal composite according to claim 1, wherein the rubber composition further comprises from 3 to 15 parts by mass of sulfur per 100 parts by mass of the diene rubber.

3. A pneumatic tire using a rubber-metal composite comprised by embedding metal reinforcing cords in a rubber composition comprising from 0.05 to 10 parts by mass of a benzothiazole anticorrosive and/or a benzotriazole anticorrosive per 100 parts of a diene rubber, the anticorrosive comprising at least one selected from the group consisting of (2-benzothiazylthio)acetic acid, 3-(2-benzothiazylthio)propionic acid, 1-[N,N-bis(2-ethylhexyl)amino methyl]tolyltriazole, 1-[N,N-bis(hydroxyethyl)aminomethyl] tolyltriazole, carboxybenzotriazole, 1-[N,N-bis(2-ethylhexyl)aminomethyl]methylbenzotriazole, 1-[N,N-bis(2-ethylhexyl)aminomethyl]benzotriazole, and 2,2'-[[(methyl-1H-benzotriazole-1-yl)methyl]imino]bisethanol.

4. The pneumatic tire according to claim 3, wherein the metal reinforcing cords are at least one selected from the group consisting of a belt cord, a carcass cord, and a bead cord.

5. The rubber-metal composite according to claim 3, wherein the metal reinforcing cords are brass-plated.

6. The rubber-metal composite according to claim 1, wherein the rubber composition further comprises from 3 to 15 parts by mass of sulfur per 100 parts by mass of the diene rubber.

7. The rubber-metal composite according to claim 1, wherein the benzothizole anticorrosive and/or a benzotriazole anticorrosive comprises from 0.1 to 2.0 parts by mass per 100 parts of the diene rubber.

8. The rubber-metal composite according to claim 1, wherein the rubber composition further comprises from 4 to 9 parts by mass of sulfur per 100 parts by mass of the diene rubber.

9. The rubber-metal composite according to claim 1, further comprising a vulcanizing agent and a filler.

10. The rubber-metal composite according to claim 9, wherein the filler comprises zinc oxide, a compounded amount thereof being from 5 to 15 parts by mass of the diene rubber.

11. The rubber-metal composite according to claim 9, wherein the filler comprises zinc oxide, a compounded amount thereof being from 7 to 11 parts by mass of the diene rubber.

12. The rubber-metal composite according to claim 1, further comprising, as the cobalt, an organic cobalt compound in the amount of 0.1 to 3.0 parts by mass per 100 parts by mass of the diene rubber and selected from the group consisting of: cobalt benzoate, cobalt naphthenate, cobalt sterate, cobalt neodecanoate, cobalt ortho-borate, cobalt octoate, and a cobalt boron complex.

13. The rubber-metal composite according to claim 1, further comprising, as the cobalt, an organic cobalt compound in the amount of 0.2 to 1.0 parts by mass per 100 parts by mass of the diene rubber and selected from the group consisting of: cobalt benzoate, cobalt naphthenate, cobalt sterate, cobalt neodecanoate, cobalt ortho-borate, cobalt octoate, and a cobalt boron complex.

14. The rubber-metal composite according to claim 1, wherein the diene rubber comprises a natural rubber.

15. The rubber-metal composite according to claim 1, wherein the anticorrosive comprises the benzothizole anticorrosive, the benzothizole anticorrosive comprising one of (2-benzothiazylthio)acetic acid and 3-(2-benzothiazylthio)propionic acid.

16. The rubber-metal composite according to claim 1, wherein the anticorrosive comprises the benzotriazole anticorrosive, the benzotriazole anticorrosive comprising at least two of 1-[N,N-bis(2-ethylhexyl)aminomethyl]tolyltriazole, 1-[N,N-bis(hydroxyethyl)aminomethyl]tolyltriazole, carboxybenzotriazole, 1-[N,N-bis(2-ethylhexyl)aminomethyl]methylbenzotriazole, 1 [N,N-bis(2-ethylhexyl)aminomethyl]benzotriazole, and 2,2'-[[(methyl-1H-benzotriazole-1-yl)methyl]imino]bisethanol.

17. The rubber-metal composite according to claim 1, wherein the metal reinforcing cords are brass-plated.

18. A rubber-metal composite comprised by embedding metal reinforcing cords in a rubber composition comprising:
   from 0.05 to 10 parts by mass of a benzothizole anticorrosive and/or a benzotriazole anticorrosive per 100 parts of a diene rubber;
   from 3 to 15 parts by mass of sulfur per 100 parts by mass of the diene rubber;
   from 5 to 15 parts by mass of zinc oxide per 100 parts by mass of the diene rubber; and
   from 0.1 to 3.0 parts by mass of an organic cobalt compound per 100 parts by mass of the diene rubber
   wherein the anticorrosive comprises at least one selected from the group consisting of (2-benzothiazylthio)acetic acid, 3-(2-benzothiazylthio)propionic acid, 1-[N,N-bis(2-ethylhexyl)aminomethyl]tolyltriazole, 1-[N,N-bis(hydroxyethyl)aminomethyl]tolyltriazole, carboxybenzotriazole, 1-[N,N-bis(2-ethylhexyl)aminomethyl]methylbenzotriazole, 1-[N,N-bis(2-ethylhexyl)aminomethyl]benzotriazole, and 2,2'-[[(methyl-1H-benzotriazole-1-yl)methyl]imino]bisethanol.

19. The rubber-metal composite according to claim 18, wherein the metal reinforcing cords are brass-plated.

* * * * *